Figure 1:
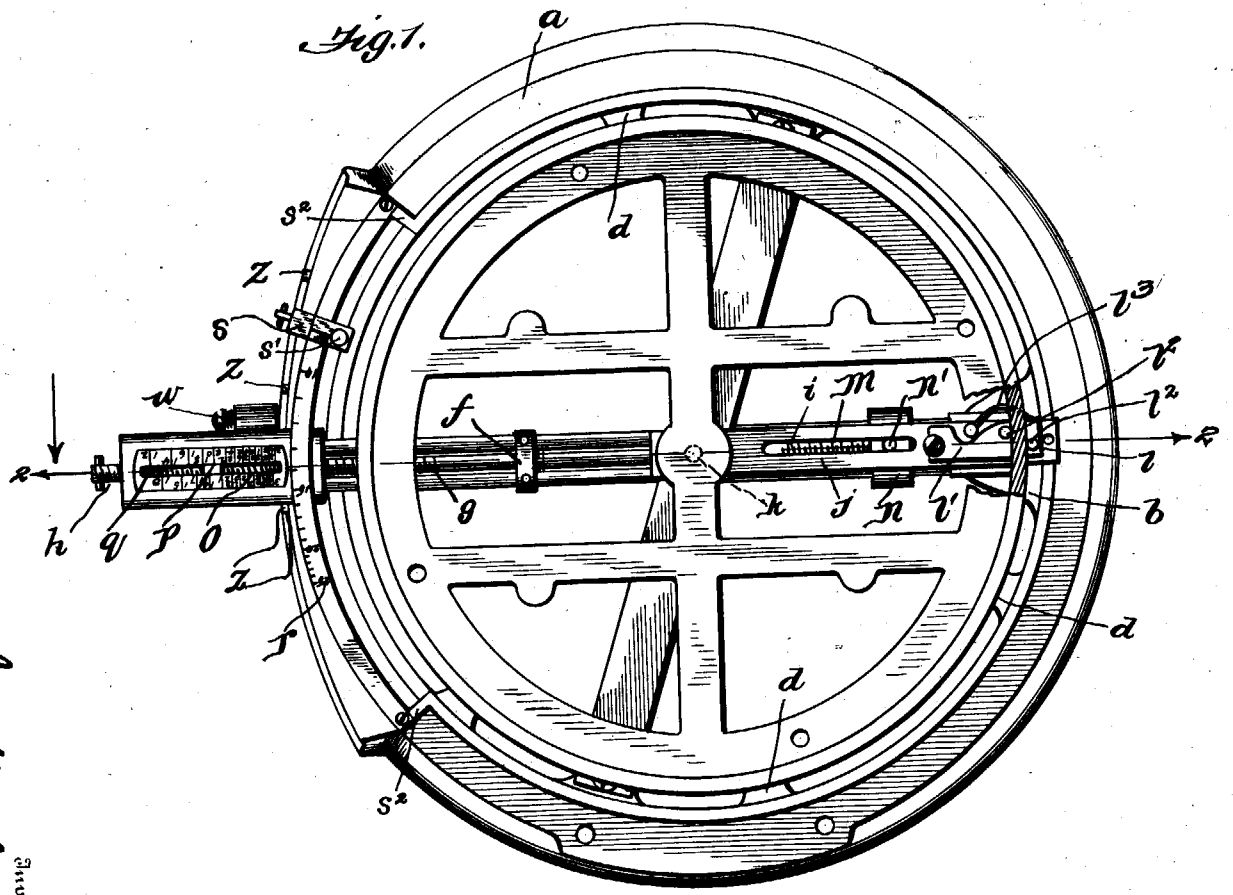

J. H. OSBORNE.

COMPUTING CHEESE CUTTER.

APPLICATION FILED SEPT. 24, 1906.

Reissued June 9, 1914.

13,746.

2 SHEETS—SHEET 1.

Witnesses

L. B. Bridges

R. W. Bishop

Inventor

John H. Osborne

By Davis & Davis

Attorney

COLUMBIA PLANOGRAPH CO., WASHINGTON, D. C.

J. H. OSBORNE.
COMPUTING CHEESE CUTTER.
APPLICATION FILED SEPT. 24, 1906.
Reissued June 9, 1914.
13,746.
2 SHEETS—SHEET 2.
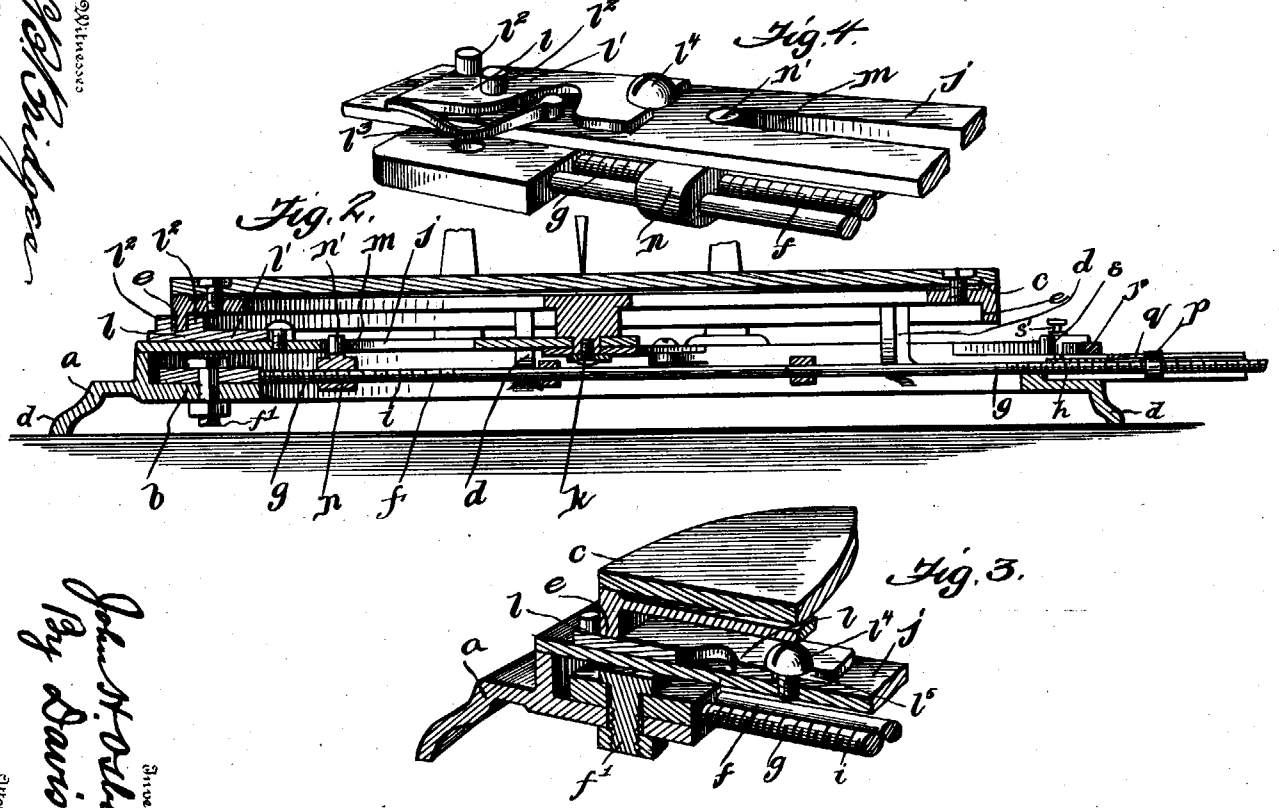
Witnesses
S. H. Bridges
R. H. Bishop
Inventor
John H. Osborne
By Davis & Davis
Attorney
COLUMBIA PLANOGRAPH CO., WASHINGTON, D. C.

UNITED STATES PATENT OFFICE.

JOHN H. OSBORNE, OF ANDERSON, INDIANA, ASSIGNOR TO THE ANDERSON COMPUTING SCALE COMPANY, OF ANDERSON, INDIANA.

COMPUTING CHEESE-CUTTER.

13,746. Specification of Reissued Letters Patent. Reissued June 9, 1914.

Original No. 797,599, dated August 22, 1905, Serial No. 224,576. Application for reissue filed September 24, 1906. Serial No. 336,067.

*To all whom it may concern:*

Be it known that I, JOHN H. OSBORNE, a citizen of the United States, and a resident of Anderson, in the county of Madison and State of Indiana, have made a certain new and useful Invention in Computing Cheese-Cutters; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a top view of the invention, partly broken away. Fig. 2 is a central sectional view. Fig. 3 is a detail sectional view showing the clutch and adjacent parts. Fig. 4 is a perspective detail view showing the clutch and adjacent parts.

The invention has relation to aliquot-part-computing cheese-cutters, and has for its object the provision of simple and efficient means for regulating the throw of the table-rotating lever in accordance with different weights of cheese and in connection therewith means for regulating such throw in accordance with different prices per pound.

With these objects in view the invention consists in the novel construction and combinations of parts, as hereinafter set forth.

Referring to the accompanying drawings, illustrating the invention, the letter *a* designates a suitable base, having an inner lug *b*, and *c* is the cheese table or carrier resting upon supporting-lugs *d* of the base, said table having a depending ring-flange *e*. *f* is the lever for rotating said table and having a fulcrum connection *f'* with lug *b* at its rear end. This lever is provided with a rotatable rod *g*, extending longitudinally thereof and turning in suitable bearings of the lever. Opposite end portions of rod *g* are screw-threaded at *h* and *i*.

*j* is a radial arm pivoted to the central pivot pin of the cheese-table at *k* and having a clutch or ratchet device *l* at its outer end operating in engagement with the ring-flange *e* of said table, said arm being provided with a longitudinal slot *m*. The clutch device shown consists of a pivoted arm $l'$, having double studs $l^2$ embracing the ring-flange *e*, a spring $l^3$ being employed to press the studs into engageemnt with said flange.

*n* is an adjustable device engaging the thread of the rear end portion of the rod *g* and having an upwardly-extending pin *n'* engaging the slot *m* of arm *j*, said connection device being prevented from turning by engagement with the outer frame-bars of the lever *f*.

A cheese-total scale graduated for total weights of different cheeses from "12" to "36", inclusive, is indicated at *o*, said scale being located at the handle end of lever *f* upon the upper surface of such handle.

*p* is an adjustable indicator device engaging the thread of the forward portion of the rod *g* and projecting through a longitudinal slot *q* of the handle-plate bearing the scale *o*. The forward end of the rod *g* projects beyond the termination of lever *f* and is provided with a suitable key-seat. Suitable stops or studs *z* are provided on the base under that part over which the lever moves which operate to limit the movement of said lever through the action of a spring-retracted pin *w* of said lever to measure off fractions of a pound.

*r* is a guide and scale bar extending transversely across the handle end of lever *f* and bearing upon its upper surface price-per-pound graduations from "10" to "25", inclusive, for prices per pound in cents. An adjustable stop-gage *s* limits the movement of the lever with relation to this scale, this gage being provided with a vertically-movable pin *s'*, adapted to be pushed down into the path of the lever.

In use the cheese is first weighed as a whole, being then placed upon the table *c*, and the rod *g* turned until the indicator *p* registers with the proper graduation upon scale *o*. At the same time the connection device or nut *n* will be adjusted in the slot of arm *j* to decrease or increase the throw of said arm upon operation of the lever *f* between the maximum-throw stops $s^2$ $s^2$. In measuring off cheese by the pound the stop-pin *s'* is raised, so that one full throw of the lever between the permanent stops $s^2$ will measure off one pound of cheese. Should three-quarters of a pound be wanted, push the spring-pin on the side of the operating-handle and pull the handle to the right until the pin strikes the third projection or stud in the base. Stopping the pin against the second or center stud will measure one-half pound and stopping against the first stud will measure one-quarter of a pound. On reversing the movement of the handle the cheese will be turned to the proper positions for the action of the cutter. In order to set the adjustable stop on the price-scale bar for cutting off pieces of cheese corresponding to money values, the stop is adjusted to the mark on the scale indicating the price per pound and the pin $s'$ pushed down into the path of the lever. Then, the operating-handle having been located between this stop and the starting-point and against the latter, on moving said handle to the left against the stop it will measure off the worth of five cents. By repeating this movement as many times five cents worth as required will be measured.

The cutting means employed is of any suitable vertically-reciprocatory character operating in a fixed plane.

I do not claim herein anything covered by the copending application of T. C. Braskett, filed March 22, 1904, Serial No. 199,416 and patented December 19, 1905, No. 807,999.

The clutch-plate $l'$ is secured to the upper face of the clutch-carrying arm by the conjoint action of a pivot-screw $l^4$ and the cheese-table. This screw or headed pin $l^4$ engages loosely a slot or notch $l^5$, formed in the inner end of the plate. The gripping-pins are arranged one in advance of the other—that is, out of radial alinement—and are so spaced with reference to each other that when the clutch-carrying arm is moved on its actuating stroke the pins grip the flange, and thereby cause the table to move with the arm, and when the arm is moved in the opposite direction the plate carrying said grip-pins will be swung sufficiently on its pivot to permit the grip-pins to slide freely on the flange without rotating the table. It will be observed that the gripping action is caused by the tendency of the plate $m$ to turn on its pivot $l^4$, this tendency to turn on its pivot being caused by the friction of the lugs against the flange. In order that the pins or lugs shall always grip the flange except when the arm is moving back to its starting position, even after some wear of the pins has taken place, I provide the plate with the notch $l^5$, so that the plate shall have a slight movement approximately radial with respect to the table.

It will be observed that an important advantage is derived by pivoting the operating-lever at a point considerably beyond the center of the table from the side at which the handle end of the lever projects. This arrangement gives an augmented throw of the handle portion, or that portion which works along the scale-plate—that is, for a given movement of the table the projecting portion of the lever will move farther and faster than the periphery of the table. This enables me to use a scale having larger graduations—*i. e.*, graduations set farther apart than would be the case were the lever pivoted at or near the center of the table, so as to rotate in unison with it. Where the lever is pivoted at or near the center, it necessarily travels the same distance as the table to measure off a given quantity of cheese, so that, particularly when a heavy cheese is being measured off and a fraction of a pound only is desired, the movement of the table will be necessarily comparatively slight, as the slice must be cut comparatively thin. This, as is obvious, will require to attain the necessary accuracy that a very fine scale be used and that all lost motion be eliminated and that the clutch shall operate with a great degree of accuracy; but by giving the lever or that part of it which works in conjunction with the scale an augmented throw a much greater degree of accuracy is obtainable with a given degree of skill and care in the construction of the table-operating devices.

Having thus described my invention, what I claim as new, and desire to secure by Letters Patent, is:—

1. In a computing cheese-cutter, the combination of a cheese-table, an operating-lever therefor bearing a cheese-total scale, a radial arm having a clutch connection with said table, a movable connection device between said lever and arm, an indicator for said scale, and means carried by said lever for changing the position of said connection device in accordance with the adjustment of said indicator, substantially as specified.

2. In a computing cheese-cutter, the combination of a cheese-table, an operating-lever for the same bearing a cheese-total scale, a radial arm pivoted centrally of said table and having a clutch connection therewith, a connection device between said lever and arm, an indicator for said scale, and means carried by said lever for simultaneously adjusting said connection device and indicator, substantially as specified.

3. In a computing cheese-cutter, the combination of a cheese-table, an operating-lever for the same bearing a cheese-total scale, an indicator for said scale, a radial arm having a clutch connection with said table, a connection device between said lever and arm, and means for simultaneously adjusting said indicator and connection device, substantially as specified.

4. In a computing cheese-cutter, the combination with a rotary cheese-table, of an operating-lever therefor bearing a cheese-total scale, an indicator for said scale, a radial arm having a clutch connection with said table, a connection device between said arm lever, and a longitudinal adjusting-rod engaging said connection device and indicator, substantially as specified.

5. A computing cheese-cutter, having in combination a rotary cheese-table, an operating-lever therefor having a fulcrum at its rear end and bearing a cheese-total scale, a radial pivoted arm having a clutch connection with said table, a connection device between said arm and lever, and means for simultaneously adjusting said connection device and indicator, substantially as specified.

6. A computing cheese-cutter, having in combination a rotary cheese-table, an operating-lever therefor having a fulcrum at its rear end and bearing a cheese-total scale, a radial pivoted arm having a clutch connection with said table and having a longitudinal slot, an indicator for said scale, a connection device engaging said slot, and a longitudinal rod carried by said lever and having threaded end portions engaging said indicator and connection device, substantially as specified.

7. In a cheese-cutter, the combination of a base-frame and a rotary table mounted thereon, a vibrating lever and means for actuating the table therefrom, a spring-retracted stop-pin carried on the handle of said lever, and a series of stops mounted on the base frame, these stops marking off fractions of a pound, for the purpose set forth.

8. In a cheese-cutter, the combination of a base-frame and a rotary table mounted thereon, a vibrating lever and means actuated thereby for rotating the table, a scale adjacent to said lever, and a slide on said scale carrying a movable stop-pin adapted to be projected into the path of said lever, for the purpose set forth.

9. In a cheese-cutter, the combination of a base-frame and a rotary table mounted thereon, a vibrating lever and means actuated thereby for rotating the table, a pair of maximum-throw stops carried by the base, intermediate stops for measuring off fractions of a pound, a part on the lever adapted to coact with said intermediate stops, a price-unit scale extending between said maximum-throw stops, and an adjustable stop on said price-unit scale.

10. In a cheese-cutter, the combination of a base-frame and a rotary table mounted thereon, a vibrating lever and means actuated thereby for rotating the table, maximum-throw stops on the base, a price-unit scale-bar extending between these stops and along which the lever works, and an adjustable slide on the scale-bar carrying a movable stop adapted to be projected into the path of the lever and arrest it at points intermediate of the maximum-throw stops, for the purpose set forth.

11. In a cheese-cutter, the combination of a base-frame and a rotary table journaled thereon, an arm pivoted concentrically with respect to the table and lying thereunder and carrying at its outer end means for gripping an annular part of the table, said arm being longitudinally slotted, a pivot-pin engaging said slot, and means for adjusting said pivot-pin in said slot, means for vibrating said pivot-pin, and means for limiting the movement of said vibrating means, for the purpose set forth.

12. In a cheese-cutter, the combination of a base-frame and a rotary table mounted thereon, a vibrating lever and means actuated thereby for rotating the table, stops on the base for determining the maximum throw of the lever, a price-unit scale-bar extending between said stops and across the lever, an adjustable stop on the scale-bar, and means whereby the lever may be permitted to vibrate between the maximum-throw stops or confined in its vibrations between one of said stops and the adjustable stop, for the purpose set forth.

13. In a cheese-cutter, the combination of a base-frame and a rotary table mounted thereon, a vibrating lever and means actuated thereby for rotating the table, a price-scale adjacent to said lever, and a slide on said scale carrying a movable stop-pin adapted to be projected into the path of said lever, for the purpose set forth.

14. In a cheese-cutter, the combination of a base-frame and a rotary table mounted thereon, a vibrating lever and means actuated thereby for rotating the table, stops on the base for determining the maximum throw of the lever, a total-weight scale and means controlled by said scale for varying the influence of the lever upon the table without varying the throw of the handle end of the lever, a price-unit scale-bar extending between said stops and across the lever, an adjustable stop on the scale-bar, and means whereby the lever may be permitted to vibrate between the maximum-throw stops or confined in its vibrations between one of said stops and the adjustable stop, for the purpose set forth.

15. In a computing cheese-cutter, the combination of a base frame, a rotary table, a single means for rotating the table varying measured distances, said means being controlled by two scales, one a total-weight scale and the other a price scale, these controlling means embodying adjustable means whereby after the parts are once set for a cheese the cheese may be cut by weight or by money value without disturbing the adjustments.

16. In a computing cheese-cutter, the combination of a base-frame and a movable table mounted thereon, a single means for moving the table varying measured distances, said means being controlled by adjustable total-weight-scale devices and adjustable price-scale devices operating in conjunction, these controlling devices embodying means whereby a cheese may be cut by weight or by value without disturbing the adjustment of either of said scale devices.

17. In a computing cheese-cutter, the combination of a base-frame and a rotary table mounted thereon, and means for rotating the table varying measured distances, said means embodying a single vibrating lever controlled by two scale means adapted to be conjointly used, these controlling means embodying devices whereby the cheese may be cut by weight or by value without disturbing the adjustments after they are once set for a cheese.

In testimony whereof I affix my signature in presence of two witnesses.

JOHN H. OSBORNE.

Witnesses:
WILLIAM C. FOSS,
JESSIE PEDEN.

Copies of this patent may be obtained for five cents each, by addressing the "Commissioner of Patents, Washington, D. C."